United States Patent [19]

Reintges et al.

[11] Patent Number: 4,725,092
[45] Date of Patent: Feb. 16, 1988

[54] SLIDABLE AND UPWARDLY PIVOTABLE ROOF FOR MOTOR VEHICLES

[75] Inventors: Rolf Reintges, Russelsheim; Richard Stahlhut, Offenbach, both of Fed. Rep. of Germany

[73] Assignee: General Motors Corporation, Detroit, Mich.

[21] Appl. No.: 889,656

[22] Filed: Jul. 25, 1986

[30] Foreign Application Priority Data

Aug. 14, 1985 [DE] Fed. Rep. of Germany ....... 3529118

[51] Int. Cl.⁴ .............................. B60J 7/05; B60J 7/19
[52] U.S. Cl. ..................................... 296/221; 296/224
[58] Field of Search .......................... 296/216, 221-224

[56] References Cited

U.S. PATENT DOCUMENTS

| Re. 28,346 | 2/1975 | Kouth et al. | 296/221 |
|---|---|---|---|
| 4,350,385 | 9/1982 | Schatzler | 296/222 |
| 4,364,601 | 12/1982 | Katayama et al. | 296/221 |
| 4,601,091 | 7/1986 | Grimm et al. | 296/221 X |
| 4,647,105 | 3/1987 | Pollard | 296/221 |
| 4,647,106 | 3/1987 | Furst | 296/216 |
| 4,684,169 | 8/1987 | Igel et al. | 296/221 |

FOREIGN PATENT DOCUMENTS

3300308A1 7/1984 Fed. Rep. of Germany .
2068304 8/1981 United Kingdom ............... 296/216

Primary Examiner—Dennis H. Pedder
Attorney, Agent, or Firm—Charles E. Leahy

[57] ABSTRACT

In a slidable-upwardly pivoting roof panel, to increase operational reliability of the actuating mechanism and to reduce wear on the individual parts, it is proposed that a slotted guide link on the panel underside towards the end of its downward movement act upon a detent lever pivotally mounted to a front sliding shoe so as to cause unlatching of the same, and that there be provided on the guide link a hold-down member which engages into a guide track during downward movement of the guide link. This arrangement will also accomplish that horizontal displacement of the closure panel via a pin engaging the slotted guide link is effected directly at a driven rear sliding shoe not only for the opening movement but also for the closing movement of the closure panel.

3 Claims, 5 Drawing Figures

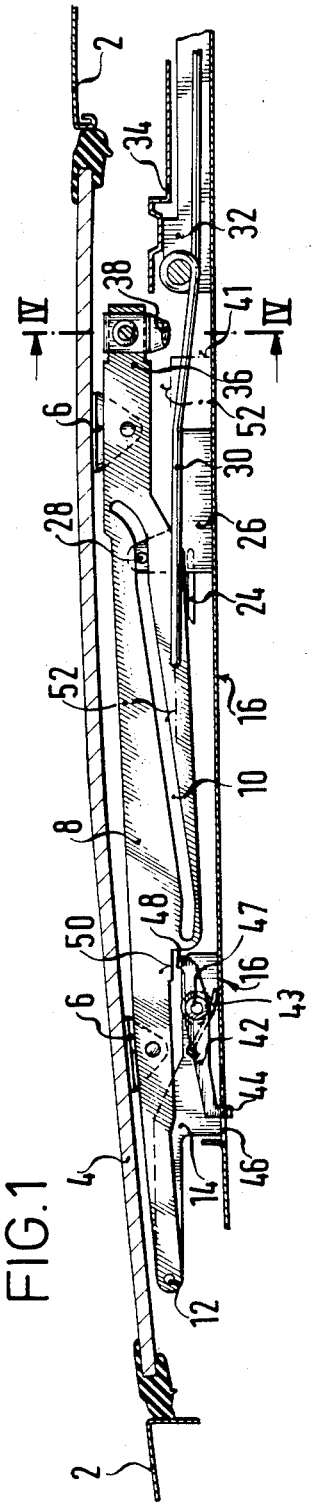
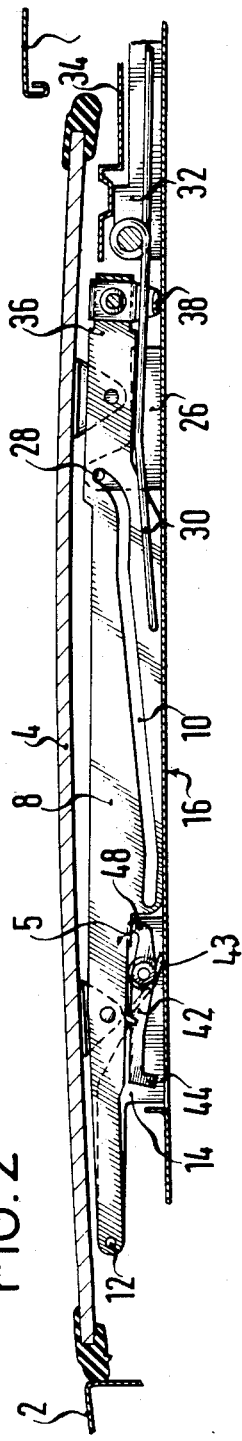
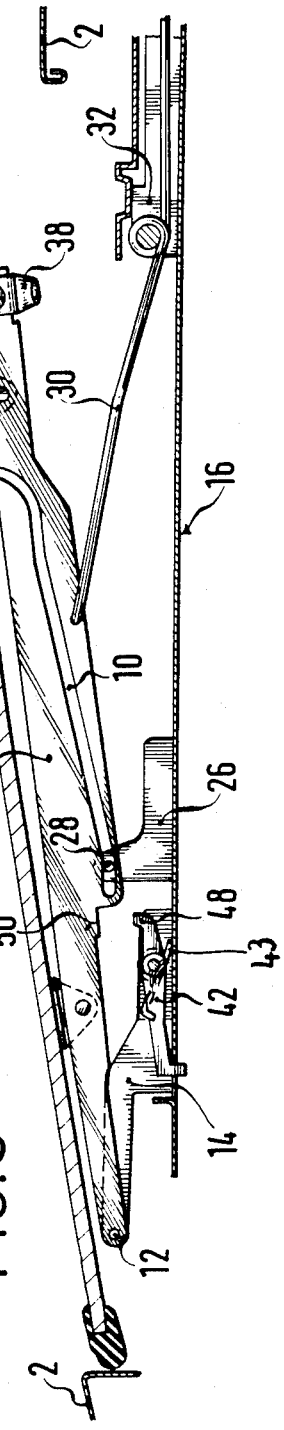
FIG.1
FIG.2
FIG.3

SLIDABLE AND UPWARDLY PIVOTABLE ROOF FOR MOTOR VEHICLES

The invention relates to a roof of the slidable and upwardly pivoting type for use in motor vehicles.

BACKGROUND OF THE INVENTION

A sunroof includes a rigid closure panel connected, by way of slotted guide links arranged on either side thereof, to a forwardly and a rearwardly disposed sliding shoe which are guided in tracks for slidable displacement therein, with the rearward shoe being driven by a cable and being provided with a pin which is adapted for engagement in a slot of the guide link, and with the forwardly disposed shoe serving as a bearing to enable pivoting movement of the closure panel, and wherein the guide link is connected, by way of a leg spring, with a further sliding element, and is secured against sliding movement by a spring-biased detent lever which engages in an aperture provided in the track.

In an arrangement of this type, which has been disclosed in German Offenlegungsschrift DE-OS No. 33 00 308, the detent lever is fastened to the sliding element which is connected with the guide link by a leg spring. This sliding element is also connected with the rain gutter at the rear of the roof. To lift the detent lever out of its locking position which it assumes with the track, there is arranged on the rearwardly disposed, cable-driven shoe an extension which extends rearwardly and which is guided on the track. Once the detent lever is moved out of its locking position, its second arm is put into locking engagement with the extension of the driven sliding shoe which will effect coupling, the arrangement being such that the closure panel is being moved into its closing position in that it is being coupled with the sliding element for independent movement by way of the leg spring, the sliding shoe, the hook and the extension. However, in view of the many parts needed, an arrangement of this type is complicated and expensive to manufacture. The closure panel actuating mechanism also occupies a relatively large amount of space, and the parts are subject to rapid wear.

SUMMARY OF THE INVENTION

It is the object of the present invention to provide a combination slidable-upwardly pivoting closure panel of the aforedescribed type which is simple in structure and reliable in operation, and wherein the travel path of the force effecting the movement of the closure panel is reduced to a minimum. This will reduce undue wear of the individual parts. The individual parts of the closure panel operating mechanism may be arranged in such a manner that they will be relatively inconspicuous when the closure member is in the open position. Furthermore, the space needed for accommodating the individual components is much smaller than in the prior-art operating mechanism described earlier.

In accordance with the invention, this object is accomplished in that the guide link, which is provided with a guide slot, is acting, as it approaches the end of its downward movement, upon the hook so as to cause unlocking of the same, and that there is provided on the guide link a hold-down member which engages the track during the downward movement of the guide link. This arrangement will provide that the sliding movement of the closure panel via the pin engaging the guide link occurs directly at the driven guide shoe, not only for the opening movement, but also for the closing movement of the closure panel.

Preferably, the detent lever is arranged at the forwardly disposed guide shoe. The arrangement of placing the detent lever in this forward position will create conditions which are most favorable in effecting the release of the same from its locking position. Obviously, the release of the detent lever from its locking position may also be accomplished by a part arranged on the guide link or on the closure panel itself. For example, the detent lever may be arranged parallel to the guide link and may be actuated by a part which is arranged on the side of the guide link. However, the invention proposes that the detent lever be arranged in the plane of the guide link, i.e., immediately below the same. This arrangement reduces the complexity of the mechanism to a minimum, because it will permit an abutment, which may be formed on the guide link, to cooperate directly with the detent lever.

According to another advantageous feature of the invention, the hold-down member is extending downwardly from the guide link and is hook-shaped, the arrangement being such that when the closure panel is lowered to initiate the opening movement, the hook-shaped portion of the hold-down member is moving through an opening provided in the guide track so as to engage the same from below, whereby the closure member during its opening and closing movement is retained in its depressed position.

There are several reasons as to why it is necessary or preferable that the closure panel be retained in this lowered position, one being that during its forward displacement, i.e., during its movement towards the closing position, the closure panel, i.e., the upwardly facing side thereof, must be prevented from making contact with the fixed roof portion. Another reason for retaining the closure panel, and thus the guide link, in a lowered position during the roof closing movement is to provide that the pin, which is connected with the driven guide shoe, is able to move the closure panel forwardly in spite of the fact that the force exerted by the pin in the slot is applied against an angled portion and that, as a result, the pin has a tendency to urge the closure panel upwardly.

Preferably, the hold-down member is disposed at the rearward end of the guide link, and it is proposed that the guide link be extended towards the rear up to the rain gutter, and that the hold-down member be arranged at the end of said extension. This arrangement will result in a favorable lever ratio, so that the load on the hold-down member at the long lever arm is reduced to a minimum.

According to a preferred arrangement, the slot in the guide link has an upwardly directed arcuate portion. This will provide that when the closure panel is lowered to initiate the opening movement, the force applied for lowering the closure panel is relatively great and therefore able to overcome the vacuum that exists above the closure panel when the vehicle is traveling, and to enable unlocking of the detent lever. As the travel of the pin in the slot progresses, the horizontal force increases while the vertical force decreases. When the detent lever is being unlocked, the hold down member has already dropped to a position below the guide rail.

BRIEF DESCRIPTION OF THE DRAWINGS

The invention will now be described by way of one exemplary embodiment.

In the drawings:

FIG. 1 is a longitudinal section of the combination slidable-upwardly pivoting closure panel;

FIG. 2 is the same section as in FIG. 1, but with the trailing end of the closure panel in the lowered position to initiate the opening movement;

FIG. 3 is the same section as in FIGS. 1 and 2 with the trailing end of the closure panel shown in the raised position;

DESCRIPTION OF THE PREFERRED EMBODIMENT

Figure 4:
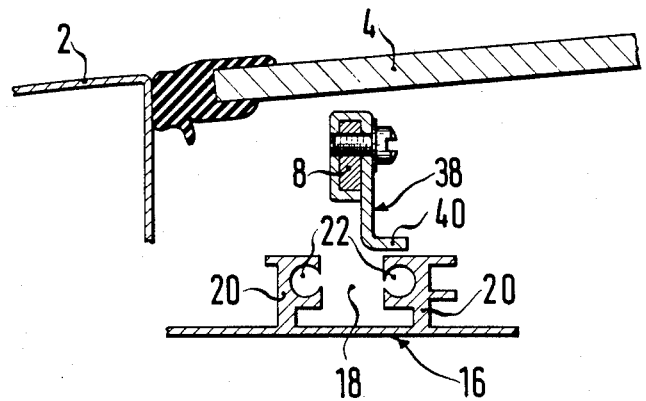
FIG. 4 is a section along line 4—4 in FIG. 1.
Figure 5:
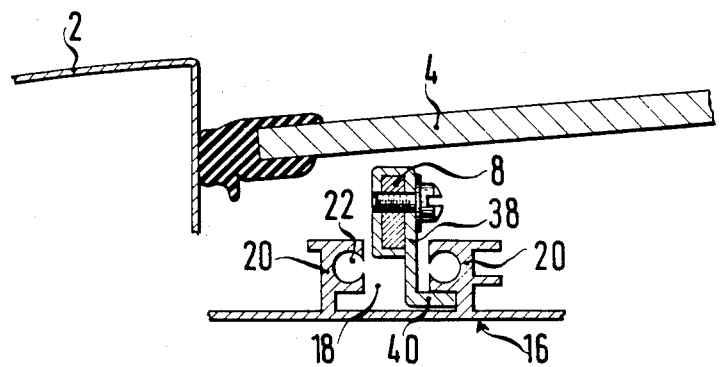
FIG. 5 is the same section as in FIG. 4, but with the closure panel being in the lowered position.

The drawings illustrate the closure panel 4 of a combination sliding-tilting roof which is arranged in an opening of a fixed roof panel 2. For a better understanding of the operating principle, the individual parts are illustrated schematically. The closure panel 4 is rigidly connected on either side by means of brackets 6 with a respective guide link 8 which is provided with a guide slot 10. The guide link 8 has its forward end pivotally connected at 12 with a forwardly disposed sliding shoe 14. The sliding shoe 14 is guided in a track 16 of which is shown in FIG. 1 only the lower portion, whereas the overall cross section thereof is illustrated in FIGS. 4 and 5. The sliding shoe 14 is arranged in the space 18 which is defined by the portions 20 of the guide rail 16. Channels 22 in the portions 20 are provided to accommodate a drive cable 24. Cable 24, which is indicated in FIG. 1, is connected to the rearwardly disposed sliding shoe 26 and causes the same to be set in motion.

The rearwardly disposed sliding shoe 26 is provided with a pin 28 which engages in the guide slot 10. The guide link 8 is connected to a further sliding element 32 by means of a leg spring 30 which is suitably biased. The sliding element 32 also has the rearward gutter 34 arranged thereon.

The guide link 8, which extends into the region of the gutter 34, has secured to the rearward end thereof the hold-down member 38 which is provided with a bent portion 40. As is apparent from FIG. 4, the hold-down member 38 and its bent portion 40 are located above the guide rail 16 when the closure panel 4 is in the closed position.

The forwardly disposed sliding shoe 14 has arranged thereon a pivotable detent lever 42 which is biased by a spring 43 such that its end 44 engages into an aperture 46 of the track 16. This is apparent from FIG. 1. The detent lever 42 has a pivoting axis 47 and an upwardly directed end 48. The guide link 8 is provided with an abutment 50 which engages the end 48 of the detent lever 42 during the downward movement of the guide link, whereby the end 44 is lifted out of the aperture 46 of the track 16.

The movement of the guide link 8 and the closure panel 4 connected therewith is readily apparent from FIGS. 1 to 3. FIG. 1 illustrates the closure panel 4, in the closed position. To initiate opening of the sliding roof, the rearwardly disposed sliding shoe 26 is moved towards the rear by the drive cable 24. Owing to the arcuate portion at the end of the slot 10, the closure panel is initially being lowered, as is illustrated in FIG. 2. During this downward movement of the guide link 8, the bent portion 40 of the hold-down member 38 is caused to move through an opening 41 in the portion 20 of track 16 and to move downwardly. This lowered position is illustrated in FIG. 5. At this moment, the abutment 50 on the guide link 8 has urged the end 48 of the detent lever 42 downwardly, which causes disengagement of the end 44 of detent lever 42 from the aperture 46 of the track 16. Now, there is nothing to stop the guide link 8 and thus the closure panel 4 from moving rearwardly. During this rearward movement, the bent portion 40 of the hold-down member 38 is sliding in the lower guideway of the track 16 so that the closure panel 4 is always maintained in the depressed position. The displacement motion is transmitted directly from the rearwardly disposed sliding shoe 26 via the pin 28 thereof at the rearward end of the slot 10 to the guide link 8.

The arcuate rearward end of the slot 10 provides that when the shoe 26 is moved rearwardly from its position according to FIG. 1 there is imposed initially a large downwardly directed force component onto the guide link 8. Upon further movement of the sliding shoe 26, the situation is reversed, i.e., the vertical force component diminishes and the horizontal force component increases. It should also be noted at this point that the respective cross sections of the sliding shoes 14 and 26 as well as that of the sliding member 32 are of a configuration to enable these members to be guided in the space 18 between the portions 20 of the track 16. For the sake of clarity, only the lower edge of the track 16 is being shown in FIG. 1, while the upper edge of the track 16 is indicated in dash-dotted lines. The detent lever 42 on the sliding shoe 14 may be arranged in a slot of the same below the guide link 8.

Thus, to effect opening of the sunroof, the closure panel 4 is displaced rearwardly from the position illustrated in FIG. 2 and is continuously retained during this rearward movement in its depressed position by the hold-down member 38. To effect movement of the closure panel 4 into its closed position, the rearwardly disposed sliding shoe 26 is driven so as to cause forward movement of the same. Its pin 28 is located at the rearward end of the slot 10 during forward movement of the sliding shoe 26 so that the guide link 8 and thus the closure panel 4 are also caused to move forwardly, because the lowered position of the guide link 8 renders the pin 28 unable to raise the same. During this movement, the hold-down member 38 has a tendency to move upwardly, but the guide link 8 will not permit such upward movement. This means that in order to keep the wear of the hold-down member 38, i.e., its bend portion 40, to a minimum, it is important that the hold-down member 38 be spaced relatively far apart from the center of gravity of the guide link 8, as compared to the point of application of the pin 28. The arcuate configuration of the rearward end of the slot 10, whose end portion is extending almost vertically, also serves to accomplish this end and to keep the vertical force component relatively small. The movement of the sliding shoe 26 and the guide link 8 continues until the hold-down member 38 has arrived at the aperture in the track 16 through which it is urged downwardly. Thereafter, the pin 28 will move the guide link 8 upwardly by way of slot 10 and will thereby force the hold-down member 38 out of the track 16. At the same time, the abutment 50 on the guide link 8 will release the detent lever 42 whose end 44 will now be urged by the force of a spring into the aperture 46 of the track 16. During this roof closing procedure, the forwardly disposed sliding shoe 14 must engage with a stop means on the track 16 to ensure proper alignment of the closure panel with the roof opening.

Movement of the closure panel 4 into its angularly raised or ventilating position requires the rearwardly disposed sliding shoe 26 to be displaced forwardly from the position according to FIG. 1. Forward movement of the pin 28 in the slot 10 will cause the rearward end of the closure panel 4 to be raised and the panel 4 to be pivoted about axis 12. During this pivoting movement, the detent lever 42 at the forwardly disposed sliding shoe 14 will remain in its locking position. The hold-down member 38 will be raised in accordance with the movement of the guide link 8 and the closure panel 4. This position is illustrated in FIG. 3.

The embodiments of the invention in which an exclusive property or privilege is claimed are defined as follows:

1. A slidable upwardly pivoting roof closure for a roof opening in a motor vehicle comprising:
    a rigid closure panel mounted by lateral spaced slotted guide links upon front and rear sliding shoes slidably guided for forward and rearward movement along laterally spaced tracks;
    each of the rear guide shoes having a pin engaging in a respective one of the slots of the slotted guide links and being driven along the tracks by drive means so that movement of the rear guide shoes relative to the guide links raises and lowers the closure panel;
    bearing means mounting the guide links on the front sliding shoes so that the roof panel may be pivoted upwardly above the roof upon forward sliding movement of the rear guide shoes relative to the front guide shoes, and the roof panel may be pivoted downwardly below the roof upon rearward sliding movement of the rear shoes relative to the front guide shoes;
    a detent lever carried by each of the front guide shoes and engaging with the tracks to hold the front guide shoes stationary against forward movement during the upward pivoting movement of the closure panel by the forward moving rear guide shoes whereby the closure panel is reliably aligned with the roof opening during upward pivoting movement through the roof opening;
    and said detent levers being engaged by closure panel during the downward pivoting movement bwlow the roof to effect disengagement of the detent levers from the tracks to enable rearward movement of the front guide shoes and closure panel upon further rearward movement of the rear guide shoes to open the roof opening.

2. A slidable upwardly pivoting roof closure for a roof opening in a motor vehicle comprising:
    a rigid closure panel mounted by lateral spaced slotted guide links upon front and rear sliding shoes slidably guided for forward and rearward movement along laterally spaced tracks;
    each of rear guide shoes having a pin engaging in a respective one of the slots of the slotted guide links and being driven along the tracks by drive means so that movement of the rear guide shoes relative to the guide links raises and lowers the closure panel;
    bearing means mounting the guide links on the front sliding shoes so that the roof panel may be pivoted upwardly above the roof upon forward sliding movement of the rear guide shoes relative to the front guide shoes, and the roof panel may be pivoted downwardly below the roof upon rearward sliding movement of the rear shoes relative to the front guide shoes;
    a detent lever carried by each of the front guide shoes and engaging with the tracks to hold the front guide shoes stationary against forward movement during the upward pivoting movement of the closure panel by the forward moving rear guide shoes whereby the closure panel is reliably aligned with the roof opening during upward pivoting movement through the roof opening;
    said levers being engaged by the closure panel guide links during the downward pivoting movement below the roof to effect disengagement of the detent levers form the tracks to enable rearward movement of the front guide shoes and closure panel upon further rearward movement of the rear guide shoes to open the roof opening;
    and hold down members carried by the guide links at the rearward ends thereof and adapted to enter into the respective tracks upon downward pivoting movement of the closure panel below the roof, said hold down members being effective to retain the closure panel below the roof during rearward opening movement and during subsequent forward closing movement of the closure panel.

3. The roof closure of claim 2 further characterized by said tracks having openings registering with the hold down members to admit the hold down members into the tracks.

* * * * *